United States Patent Office.

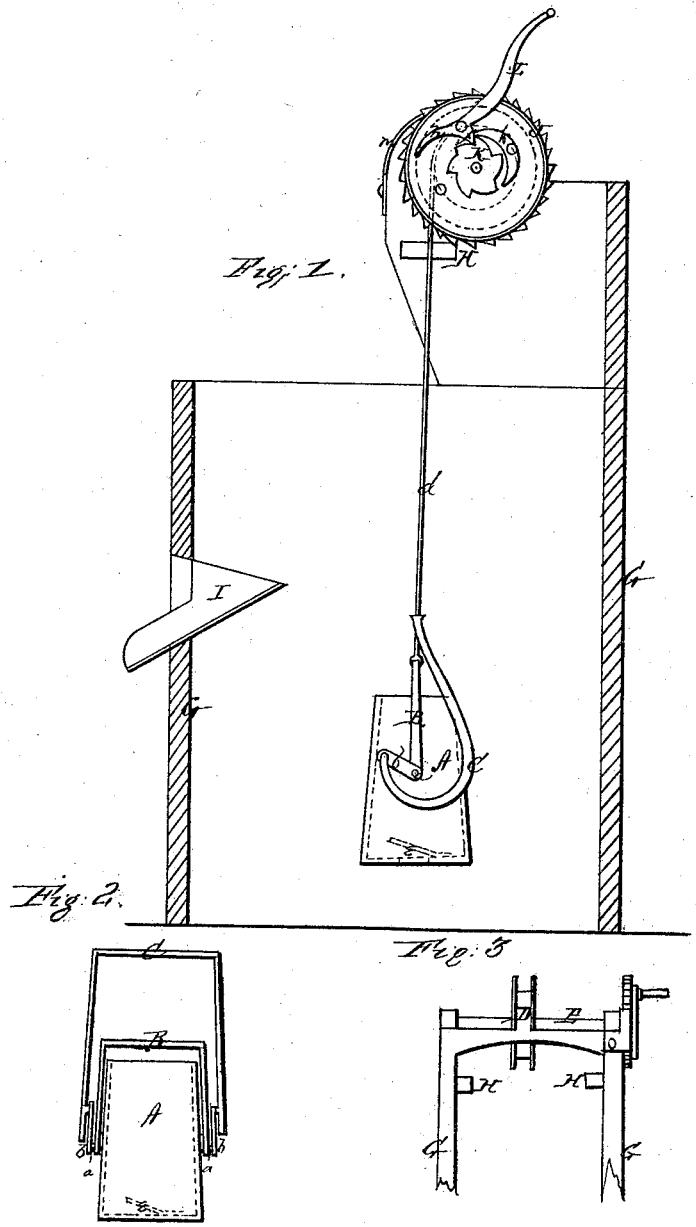

MERRICK A. MIHILLS, OF LODI, OHIO.

Letters Patent No. 113,440, dated April 4, 1871.

IMPROVEMENT IN APPARATUS FOR DRAWING WATER FROM WELLS.

The Schedule referred to in these Letters Patent and making part of the same.

*To all whom it may concern:*

Be it known that I, MERRICK A. MIHILLS, of Lodi, in the county of Medina and in the State of Ohio, have invented certain new and useful Improvements in Apparatus for Drawing Water from Wells, &c.; and do hereby declare that the following is a full, clear, and exact description thereof, reference being had to the accompanying drawing and to the letters of reference marked thereon making a part of this specification.

The nature of my invention consists—

First, in the construction and arrangement of the well-bucket and the tipping apparatus belonging thereto; and Second, in the construction and arrangement of a reacting windlass, to be placed in connection with the bucket and tipping apparatus.

In order to enable others skilled in the art to which my invention appertains to make and use the same, I will now proceed to describe its construction and operation, referring to the annexed drawing, in which—

Figure 1 is a longitudinal vertical section of the well-house, showing the bucket, tipping apparatus, and reacting windlass;

Figure 2 is a front view of the bucket and tipping apparatus; and

Figure 3 is a front view of the top of the well-house.

A represents the bucket, provided on its sides with journals $a\ a$, on which the bail B is placed.

On the journals $a\ a$ are secured cranks $b\ b$, which project upward and forward, as shown in fig. 1.

To the outer ends of the cranks or ears $b\ b$ are attached the lower ends of the bail C, which is bent in semicircular form under the cranks, as shown in fig. 1, and then passes upward and above the bail B.

The rope $d$ passes through an opening in the center of the bail C and is attached to the bail B, its upper end being attached to a flanged pulley, D, on the shaft E, at the top of the well-house G.

The bucket A, after being filled through the valve $e$ in its bottom, is raised up by the turning of the shaft E until the bail C strikes bars H H, placed on the inside at the top of the well-house. This causes the long bail C to pull down the ends of the cranks $b\ b$, thereby tipping the bucket sufficient to empty it through the spout I.

The reacting windlass placed on the end of the shaft E is for the purpose of running the bucket back to the water without the labor of turning it back by hand.

It consists of a large ratchet-wheel, J, about six inches in diameter, which turns loosely upon a shoulder of the dog-wheel K upon the back side. The wheel K is made solid upon the end of the shaft E.

The crank L is made fast by means of a screw passing through the large ratchet-wheel J, and its inner end forms the dog $f$ and arm $h$.

Another arm, $k$, is also pivoted to the wheel J, one end of which arm bears on the dog $f$, as shown.

When the crank L is turned in the usual direction toward the right, the dog $f$ engages with the wheel K and turns the shaft E with its pulley D for raising the bucket; but when the crank is pressed down in the opposite direction the dog $f$ will rise from the ratchet K, thereby causing the two arms $h\ k$ to grasp the said wheel, and the weight of the bucket will turn the shaft E backward at any speed desired, the large ratchet-wheel J being held in position by the pawl $m$.

A cap is to go over all the gearing shown, so that it will be out of sight.

Having thus fully described my invention,

What I claim as new, and desire to secure by Letters Patent, is—

The reacting windlass, consisting of the ratchet-wheel J, dog-wheel K, crank L, dog $f$, arms $h\ k$, and pawl $m$, all constructed and arranged to operate substantially as and for the purposes herein set forth.

In testimony that I claim the foregoing I have hereunto set my hand this 12th day of May, 1870.

MERRICK A. MIHILLS.

Witnesses:
R. F. HICKOX,
N. HARRIS.